W. V. TURNER & R. H. BLACKALL.
ELECTRIC FLUID PRESSURE BRAKE.
APPLICATION FILED FEB. 24, 1904.
937,393.
Patented Oct. 19, 1909.
2 SHEETS—SHEET 1.
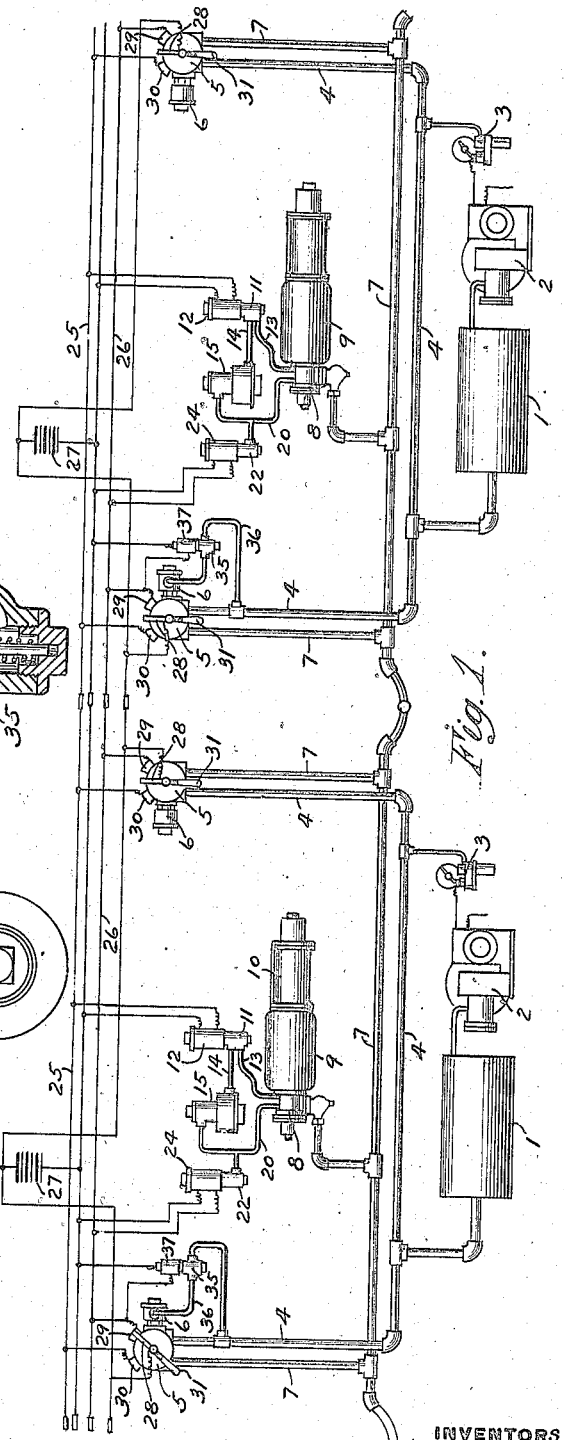
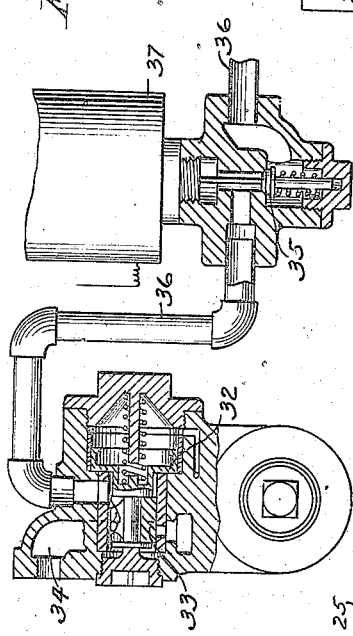
WITNESSES
Wm. M. Cady
E. B. Olney
INVENTORS
Walter V. Turner
Robert H. Blackall
by E. Wright Att'y.

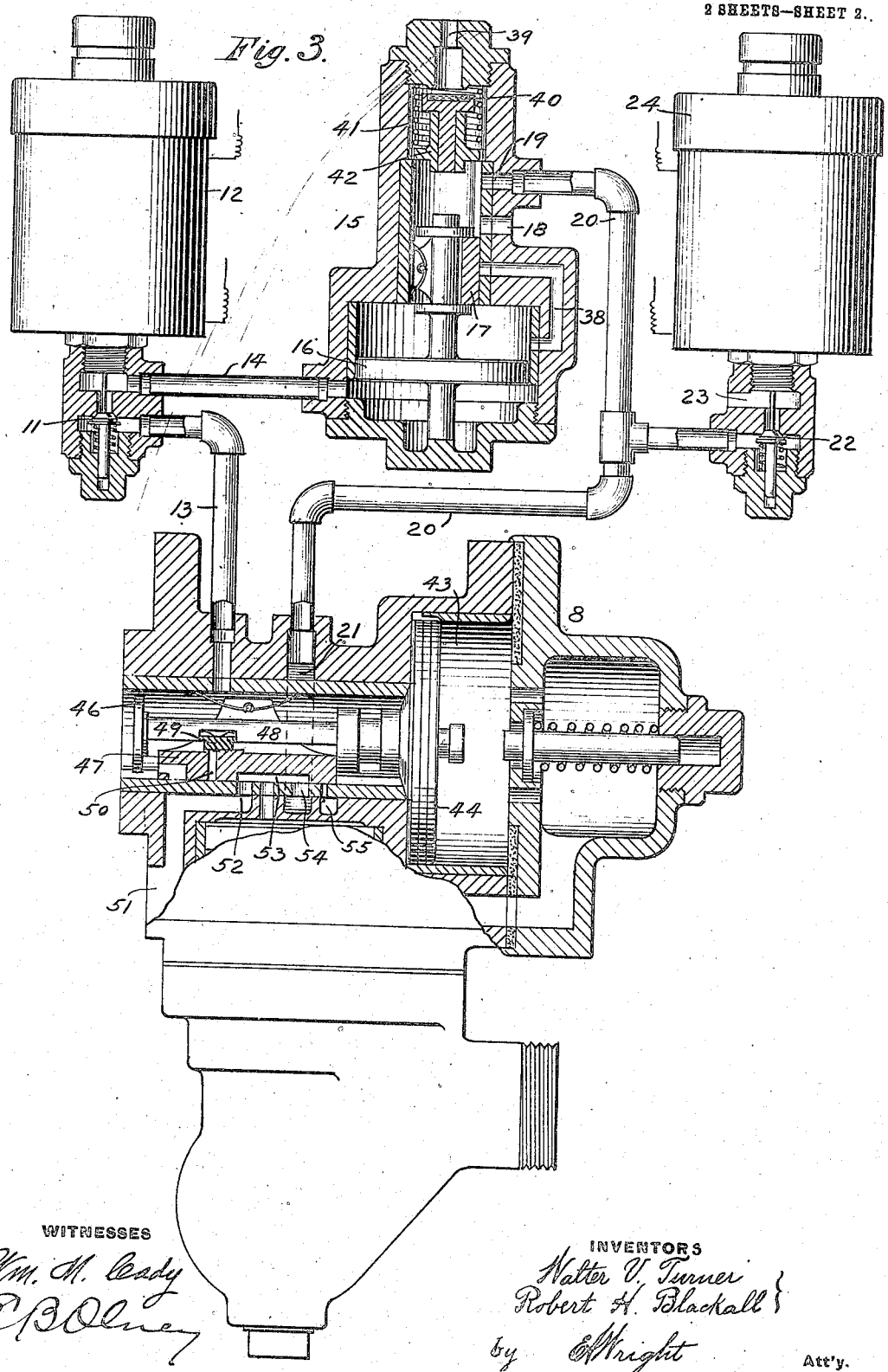

UNITED STATES PATENT OFFICE.

WALTER V. TURNER, OF WILKINSBURG, AND ROBERT H. BLACKALL, OF EDGEWOOD PARK, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

ELECTRIC FLUID-PRESSURE BRAKE.

937,393.

Specification of Letters Patent. Patented Oct. 19, 1909.

Application filed February 24, 1904. Serial No. 195,041.

*To all whom it may concern:*

Be it known that we, WALTER V. TURNER and ROBERT H. BLACKALL, citizens of the United States, residing, respectively, in Wilkinsburg and Edgewood Park, both in the county of Allegheny and State of Pennsylvania, have invented a certain new and useful Improvement in Electric Fluid-Pressure Brakes, of which the following is a specification.

This invention relates in general to automatic fluid pressure brakes for railway cars, and has for its principal object to provide additional electrically and pneumatically operated valve devices adapted to be applied to a standard type of automatic fluid pressure brake apparatus, whereby the brakes may be operated either electrically by the manipulation of a suitable switch, or pneumatically by the manipulation of the usual brake valve devices or automatically by the venting of the train pipe due to accident.

Another object is the provision of means whereby, after the brakes have been applied by the action of the electrically operated valves, the brake cylinder pressure may be released pneumatically by a certain manipulation of the ordinary brake valve of the fluid pressure brake apparatus, so that, in case the electric current should fail after the brakes had been applied, or if for any other reason the electrically operated release valves should fail to work, the brakes may still be released readily at any time desired.

A further object of the invention is the provision of an electrically operated valve for opening the supply of fluid from the main reservoir to the train pipe on each car when the electrically operated release valves are opened.

With these, as well as other objects in view, this invention comprises in general, in addition to the usual standard automatic air brake apparatus, electrically operated valves for controlling the supply of air to the brake cylinder and the release of the same therefrom, and means coöperating therewith for suitably controlling ordinary brake cylinder exhaust. The electrically operated application valve is adapted to open communication from the auxiliary reservoir or other reservoir or source of supply to the brake cylinder, but it is obvious that at this same time the ordinary brake cylinder exhaust at the triple valve must be held closed in order to retain the pressure in the brake cylinder.

Various devices for simultaneously closing the ordinary brake cylinder exhaust when the electric application valve is opened may be devised, and this invention is not limited to any special form of device for this purpose, but as a preferred means we have shown a fluid pressure valve mechanism operated by the flow of air through the electric application valve to the brake cylinder to close the ordinary brake cylinder exhaust.

In order that the brakes may be released pneumatically, even though the same have been applied by the action of the electric application valve, it is necessary that means, independent of the electrically operated valves, be provided for opening the ordinary brake cylinder exhaust, and another important feature of our invention comprises means operating in response to variations in train pipe pressure, preferably by the movement of the triple valve device, for actuating the fluid pressure valve mechanism to open said brake cylinder exhaust.

This invention is especially adapted to be applied to automatic air brake apparatus as employed on motor cars operating on the multiple unit principle, in which each car of the train is provided with an air compressor, and main reservoir, and another feature of our invention comprises an electrically actuated recharging valve for controlling the supply of compressed air from the main reservoir through a suitable regulating or feed valve to the train pipe on each car, said electric supply valves being controlled by the same circuit as the electric release valves, whereby when the brakes are released electrically, communication is opened to the train pipe from the main reservoir on each car, so that all of the air pumps and main reservoirs are utilized in restoring the pressure in the train pipe and auxiliary reservoirs.

Our invention also comprises certain other improved features, all of which will hereinafter be more fully described and claimed.

In the accompanying drawings, Figure 1 is a diagrammatic representation of an air brake system embodying our improvements, as applied to two motor cars coupled together; Fig. 2 a section showing the electrically operated recharging valve and its connection with the feed valve device; and Fig. 3 a view showing the triple valve, electrically operated application and release valves, and the valve device for controlling the triple valve exhaust, with their pipe connections, the valve devices being shown in section.

As shown in Fig. 1 the invention is illustrated as applied to a train of two motor cars, in which each car is provided with a main reservoir 1, motor driven air compressor 2, pump governor 3, main reservoir pipe 4, motorman's brake valve 5, preferably one at each end of the car, having the usual feed valve device 6, train pipe 7, triple valve 8, auxiliary reservoir 9, and brake cylinder 10, all of which with the slight modification in the triple valve device hereinafter described may be the ordinary standard air brake apparatus, the construction and operation of which is well understood in the art.

In addition to the above equipment, we provide an electric application valve 11 operated by electromagnet 12, and controlling the supply of air from the pipe 13 leading from the auxiliary reservoir or other source to the pipe 14 leading to the valve device 15 containing piston 16, slide valve 17, exhaust port 18 and port 19 connected by pipe 20 with the usual exhaust port 21 of the triple valve device. An electric release valve 22 having exhaust port 23 is connected to the brake cylinder preferably through the pipe or passage 20 from the triple valve exhaust port, and is operated by an electromagnet 24. These electromagnets 12 and 24 on each car are connected up with the respective circuit wires 25 and 26 running through the train, the current for operating the same being supplied from a battery 27 or other source of electricity. A switch, having a movable arm 28 and contact points 29 and 30, may be used for controlling the respective electric circuits, and the movable switch arm may be operated either separately or in connection with the handle 31 of the motorman's brake valve, as indicated in the diagram.

The feed valve device for regulating the train pipe pressure may be of the usual standard construction, see Fig. 2, comprising a casing containing the piston 32 and slide valve 33 for regulating the flow of air from the main reservoir passage or connection to the train pipe passage or connection 34, the pressure on the rear of the piston 32 being controlled by the usual diaphragm valve (not shown) subject to train pipe pressure, all of which will be readily understood by those familiar with this art without further description.

According to another feature of our invention, an additional electric recharging valve 35 is employed for controlling the supply of air from the main reservoir pipe through pipe 36 to the slide valve chamber of the feed valve device, this recharging valve being operated by an electromagnet 37 connected up with the circuit wire 26 of the electric release valves, whereby these recharging valves on each car may be opened automatically when the brakes are released electrically and thus secure the assistance of each pump and main reservoir in restoring and maintaining the normal standard degree of pressure in the train pipe and auxiliary reservoirs.

The triple valve device comprises the usual piston chamber 43, containing piston 44, valve chamber 46 open to the auxiliary reservoir and containing main slide valve 47, piston stem 48, graduating valve 49 controlling service port 50, port 52 leading to the brake cylinder passage 51, and main exhaust cavity 53 connecting brake cylinder port 52 with the usual exhaust passage 54 in release position. An additional exhaust or release port 55 normally closed by the main slide valve is located near to the main exhaust passage.

When the two or more cars provided with our improvements are coupled up in a train, the brakes will be manipulated by means of the motorman's brake valve and operating switch at the front end of the head car, as, for instance, the one at the left in Fig. 1, the handles of the other brake valves and operating switches being set in the lap or off position, as indicated. The handle 31 of the forward brake valve will be set in running position and if the movable switch arm 28 is operated by the same handle the arm will then be touching contact point 29, which will correspond also to the electric release position, in which the circuit is complete from the battery through wire 26, thereby energizing the magnets 24 of the brake cylinder release valves 22 and also magnets 37 of the recharging valves 35. Air from the main reservoirs on all the cars will then flow through pipe 36 to the respective feed valves and thence to the train pipe, charging the same and the auxiliary reservoirs to normal standard pressure. It will also be noted that the usual feed port will also be open at the head brake valve for charging the train pipe through the feed valve, since this brake valve stands in running position.

In order to apply the brakes electrically, the movable switch arm 28 at the head end is then turned to electric application position, in which the arm engages the contact point 30, thereby breaking the circuit to the release magnets 24, which allows the release valves 22 to close, and completing the circuit 25 to the magnets 12, which cause the valves 11 to open communication from the auxiliary reservoir and pipe 13 to pipe 14 leading to the chamber beneath the piston 16 of the valve device 15. This immediately forces the piston to its upper position, opening the port 38 around the piston and closing the exhaust port 18. The piston stem also engages the stem 42 of spring 41 and closes valve 40 for preventing any leakage through port 39. The air then continues to flow through pipe 20 to the exhaust passage 54 of the triple valve and through exhaust cavity 53, ports 52 and 51 to the brake cylinder. When the desired pressure has been admitted to the brake cylinder the arm 28 is turned to break contact at 30, thereby deenergizing magnets 12 and allowing the valves 11 to close.

To release the brakes electrically, the switch is turned back to its first position, engaging contact 29 and completing circuit 26 of the release valve magnets 24 and opening valves 22 whereby the brake cylinder pressure is released through pipe 20 and port 23 to the atmosphere, at the same time that each of the recharging valves is opened for restoring pressure in the train pipe and auxiliary reservoirs from all the main reservoirs, as before described.

After the brakes have been applied by means of the electric application valves, should the current fail, or for any other reason should it be found that the electric release valves would not work, all that is necessary to secure a release of the brakes pneumatically is to make a slight reduction in train pipe pressure sufficient to move the triple valves to connect ports 54 and 55 through the main exhaust cavity 53, thereby exhausting the air from pipe 20 and valve device 15 on both sides of piston 16 to the atmosphere. Then when the triple valve piston 44 is afterward moved to release position under an increase of train pipe pressure, the air from the brake cylinder passing through the exhaust passage 54 and pipe 20 immediately moves the piston 16 downward sufficiently to open the exhaust port 18 and escape to the atmosphere.

If the exhaust port 18 should remain closed by valve 17 after an electric release of the brakes, it will not interfere with the pneumatic application and release, since the pressure beneath the piston 16 will then be reduced to that of the atmosphere either by leakage around said piston or through the port 38 to the exhaust port 23 without the use of the additional exhaust port 55, and consequently, if the brakes are applied pneumatically by reducing the train pipe pressure and then released by increasing the train pipe pressure in the usual way, the flow of air from the brake cylinder through pipe 20 to the chamber above piston 16 immediately moves said piston downward sufficiently to open the exhaust port 18 and escape to the atmosphere. It will also be observed that after the brakes have been applied pneumatically in the usual way, if any triple valve should stick and fail to move to release position under an increase of train pipe pressure, the auxiliary reservoir pressure may be reduced by opening the electrical application valve, in case the supply for said valve is taken from the auxiliary reservoir, thereby partially bleeding the auxiliary reservoir to the atmosphere through pipes 13, 14, 20 and exhaust ports 54 and 55, and thus cause the movement of the triple valve to release position.

When the pressure is released from the valve device 15 the small valve 40 falls by gravity and opens the escape port 39, so that in case the exhaust port 18 should remain closed after an electric release of the brakes, the triple valve exhaust would still have an outlet to the atmosphere for the escape of leakage to the brake cylinder.

The spring stop 41, 42, acts as a cushion for the upward movement of the piston 16, which also insures the seating of the valve 40.

It will now be apparent that by means of the addition of our improvements, a combined electric and automatic fluid pressure brake apparatus is provided whereby the brakes may be applied and released either electrically or pneumatically, or may be applied electrically and released pneumatically, or may be applied pneumatically and released electrically, thereby retaining all of the advantageous features of the standard automatic air brake system, which may be brought into use at any time, and also securing the additional advantages of the electrically operated system.

Having now described our invention, what we claim as new and desire to secure by Letters Patent is:—

1. In a fluid pressure brake, the combination with a train pipe, auxiliary reservoir, triple valve and brake cylinder, of an electrically operated valve for controlling the supply of air to the brake cylinder, and a pressure operated valve for controlling the outlet from the triple valve exhaust port.

2. In a fluid pressure brake, the combination with a train pipe, auxiliary reservoir, triple valve and brake cylinder, of an electrically operated valve for controlling the supply of air from the auxiliary reservoir to the brake cylinder, and a valve operated by the flow of air to the brake cylinder for closing the outlet from the triple valve exhaust port.

3. In a fluid pressure brake, the combination with a train pipe, auxiliary reservoir, triple valve and brake cylinder, of an electric application valve for supplying air to the brake cylinder, a pressure operated valve for controlling the triple valve exhaust, and an electric release valve for controlling the pressure valve and the release from the brake cylinder.

4. In a fluid pressure brake, the combination with a train pipe and brake cylinder, of a pneumatically operated valve device for controlling the supply of air to the brake cylinder and from the brake cylinder to the exhaust, an electrically actuated valve mechanism for also controlling the supply of air to the brake cylinder, and means actuated by the flow of air through the electrical valve for closing the exhaust from the pneumatically operated valve.

5. In a fluid pressure brake, the combination with a train pipe and brake cylinder, of a pneumatically operated valve device for controlling the supply of air to the brake cylinder and from the brake cylinder to the exhaust, an electrically actuated valve mechanism for also controlling the supply of air to the brake cylinder, and the release from the brake cylinder to the atmosphere, and means acting in conjunction with said electrical valve for closing the exhaust from the pneumatically operated valve.

6. In a fluid pressure brake, the combination with a train pipe and brake cylinder, of a valve device operated by variations in train pipe pressure for controlling communication from the auxiliary reservoir to the brake cylinder, and from the brake cylinder to the atmosphere, and an electrically actuated valve mechanism for supplying air to the brake cylinder through the exhaust port of the first mentioned valve device.

7. In a fluid pressure brake, the combination with a train pipe and brake cylinder, of a valve device operated by variations in train pipe pressure for controlling communication from the auxiliary reservoir to the brake cylinder, and from the brake cylinder to the atmosphere, an electrically actuated valve mechanism for controlling the supply of air to the brake cylinder through the exhaust passage of the first mentioned valve device, and means operated by the flow of air through said electrical valve for closing the brake cylinder exhaust to the atmosphere.

8. In a fluid pressure brake, the combination with a train pipe, auxiliary reservoir, triple valve and brake cylinder, of an electrically actuated valve for supplying air to the brake cylinder, a valve device actuated by the flow of air through the electrical valve for closing the exhaust from the triple valve, and means operating in response to variations in train pipe pressure for opening said triple valve exhaust to the atmosphere.

9. In a fluid pressure brake, the combination with a train pipe, auxiliary reservoir, triple valve and brake cylinder, of an electrically actuated valve for supplying air to the brake cylinder, a valve device actuated by the flow of air through the electrical valve for closing the exhaust from the triple valve, and means operated by the triple valve device for opening said triple valve exhaust to the atmosphere.

10. In a fluid pressure brake, the combination with a train pipe, auxiliary reservoir, triple valve and brake cylinder, of an electrically actuated valve for supplying air to the brake cylinder, a valve device having a piston actuated by the flow of air through the electrical valve for closing the exhaust from the triple valve, and a release port controlled by the triple valve for releasing air from both sides of said piston whereby said triple valve exhaust may be opened.

11. In a fluid pressure brake, the combination with a train pipe, auxiliary reservoir, triple valve and brake cylinder, of an electrically operated valve mechanism for controlling the supply of air to the brake cylinder and the release of same to the atmosphere, a valve device comprising a piston and valve actuated by the flow of air through the electrical application valve for closing the triple valve exhaust, a valve having a port for releasing air from said piston and a movable abutment subject to the opposing pressures of the auxiliary reservoir and the train pipe for actuating said last named valve.

12. In a fluid pressure brake, the combination with a main reservoir, train pipe, auxiliary reservoir and brake cylinder, of an electrically operated valve mechanism for controlling the supply of air to the brake cylinder and its release from the brake cylinder, and an electrically operated recharging valve device for opening communication from the main reservoir to the train pipe.

13. In a fluid pressure brake, the combination with a main reservoir, train pipe, brake valve, auxiliary reservoir, triple valve and brake cylinder, of a feed valve device for regulating the supply from the main reservoir to the train pipe, an electrically operated release valve for the brake cylinder and an electrically operated recharging valve device for simultaneously opening communication from the main reservoir through the feed valve device to the train pipe.

14. In a fluid pressure brake, the combination with a train pipe, reservoir, and brake cylinder, of an application valve means governed by fluid under pressure for controlling the supply of air to the brake cylinder, and an automatic valve device normally affording communication from the application valve to the brake cylinder but operated by a reduction in train pipe pressure to cut off said communication and open communication from the reservoir to the brake cylinder.

15. In a fluid pressure brake, the combination with a train pipe, reservoir, and brake cylinder, of an application valve means for controlling the supply of air from the reservoir to the brake cylinder, an automatic valve device operated by the opposing pressures of the reservoir and the train pipe to control communication from the application valve to the brake cylinder and from the reservoir to the brake cylinder.

16. In a fluid pressure brake, the combination with a train pipe, reservoir, and brake cylinder, of an automatic valve device operating upon a reduction in train pipe pressure for supplying air from said reservoir to the brake cylinder, and an application valve means for also supplying air from said reservoir to the brake cylinder through the passage of the automatic valve device for releasing air from the brake cylinder.

In testimony whereof we have hereunto set our hands.

WALTER V. TURNER.
ROBERT H. BLACKALL.

Witnesses:
R. F. EMERY,
JAS. B. MACDONALD.